United States Patent [19]

Murakami

[11] Patent Number: 4,751,550
[45] Date of Patent: Jun. 14, 1988

[54] IMAGE FORMING APPARATUS CAPABLE OF COPYING AN ORIGINAL IN A PLURALITY OF IMAGE FORMING MODES

[75] Inventor: Koichi Murakami, Yokohama, Japan

[73] Assignee: Canon Kabushiki Kaisha, Tokyo, Japan

[21] Appl. No.: 895,597

[22] Filed: Aug. 15, 1986

Related U.S. Application Data

[63] Continuation of Ser. No. 558,982, Dec. 7, 1983, abandoned.

[30] Foreign Application Priority Data

Dec. 15, 1982 [JP] Japan .................................. 57-219525

[51] Int. Cl.[4] .......................... G03G 15/00; B65H 31/24
[52] U.S. Cl. ............................... 355/14 SH; 355/3 SH; 271/288
[58] Field of Search ............. 355/14 SH, 14 R, 14 C, 355/14 CU; 271/288, 289, 290, 298

[56] References Cited

U.S. PATENT DOCUMENTS

| | | |
|---|---|---|
| 3,871,643 | 3/1975 | Kukucka et al. |
| 4,012,032 | 3/1977 | Rogers ...................... 271/290 |
| 4,078,787 | 3/1978 | Burlew et al. ............. 355/14 SH Y |
| 4,212,457 | 7/1980 | Guenther .................... 271/288 |
| 4,248,525 | 3/1981 | Sterrett ...................... 355/14 SH |
| 4,370,052 | 1/1983 | Murakami et al. |
| 4,445,680 | 5/1984 | Kikuchi et al. ............. 271/290 |
| 4,449,812 | 5/1984 | Furuichi et al. |
| 4,502,776 | 3/1985 | Matsumoto et al. ........... 355/14 SH |

FOREIGN PATENT DOCUMENTS

| | | |
|---|---|---|
| 2360178 | 3/1973 | Fed. Rep. of Germany . |
| 3014833 | 4/1980 | Fed. Rep. of Germany . |
| 3036648 | 9/1980 | Fed. Rep. of Germany . |
| 3141447 | 10/1981 | Fed. Rep. of Germany . |
| 0047059 | 4/1981 | Japan .............................. 355/14 SH |

OTHER PUBLICATIONS

*IBM Technical Disclosure Bulletin,* vol. 23, No. 6, Nov. 1980, Eichhorn et al., "Collator Programmable for Mix of Collate and Noncollate Distribution", pp. 2223-2224.

*Primary Examiner*—R. L. Moses
*Assistant Examiner*—J. Pendegrass
*Attorney, Agent, or Firm*—Fitzpatrick, Cella, Harper & Scinto

[57] ABSTRACT

An image forming apparatus has an original feeder which is operable in a first mode in which a plurality of originals are fed to an exposure position one at a time and an exposure operation is carried out a preset number of times for each original and a second mode in which the plurality of originals are fed to the exposure position one at a time and one cycle of exposure operation is carried out for each original and the above operation is repeated by the preset number of times, a storage having a plurality of record sheet trays, and a control unit for controlling the storage such that the record sheets are distributed to the trays in the first mode and the record sheets are stored in one of the trays in the second mode.

6 Claims, 7 Drawing Sheets

FIG. 2

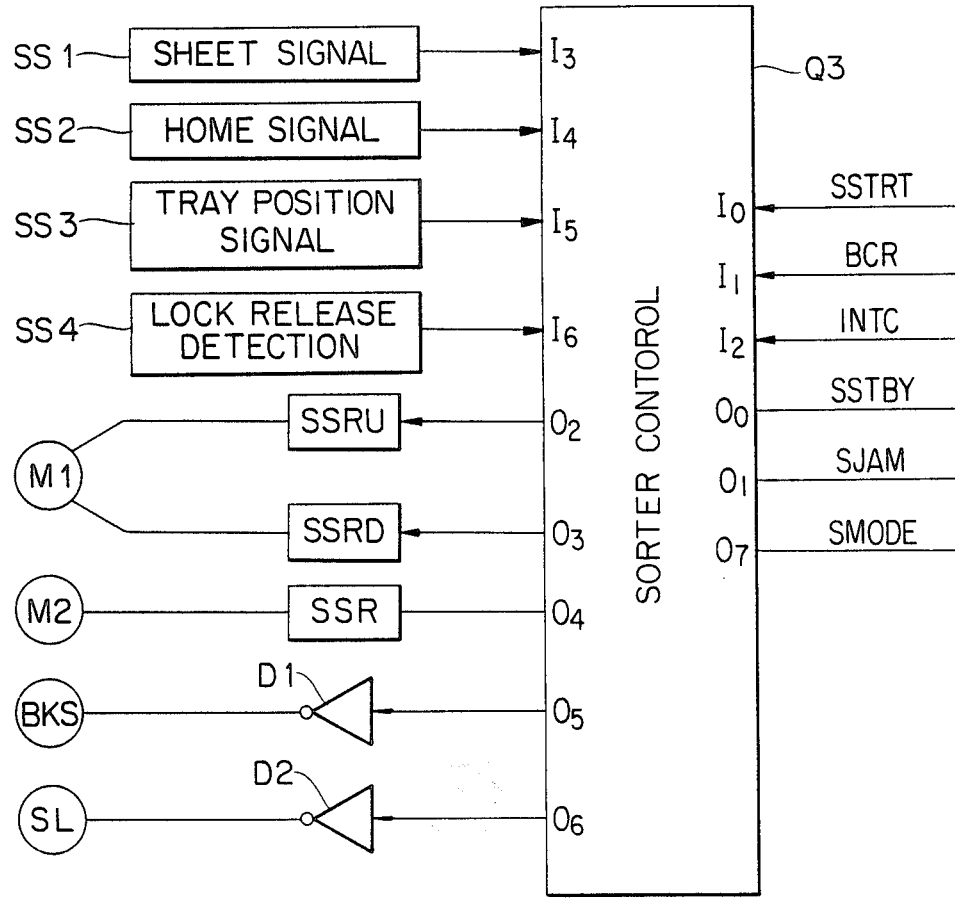

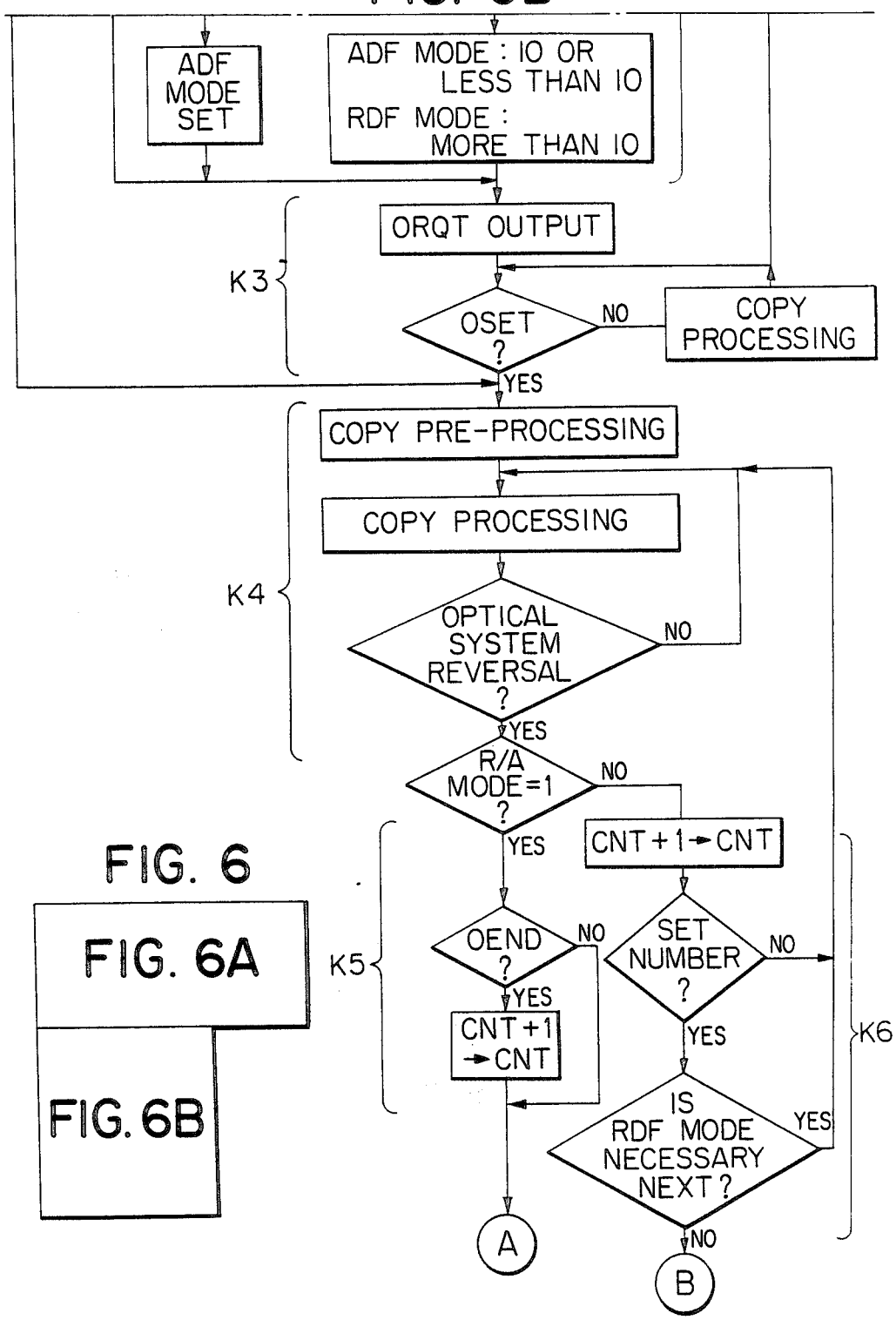

IMAGE FORMING APPARATUS CAPABLE OF COPYING AN ORIGINAL IN A PLURALITY OF IMAGE FORMING MODES

This application is a continuation of application Ser. No. 558,982 filed Dec. 7, 1983 now abandoned.

BACKGROUD OF THE INVENTION

1. Field of the Invention

The present invention relates to an image forming apparatus including copying, machine capable of copying an original document in one of a plurality of image forming modes and a sheet handling device (hereinafter referred to as a sorter) for distributing and storing sheets such as copy papers or record papers having images formed thereon.

2. Description of the Prior Art

A sorter usually has ten to twenty sheet trays. When an operator of the image forming apparatus such as the copying machine wants a larger number of copies than the number of trays, the copies in excess of the number of trays cannot be properly distributed or stored without complex intervention of the operator when an automatic original sheet feeder is not used or even when the automatic original sheet feeder is used.

SUMMARY OF THE INVENTION

The present invention provides an image forming apparatus capable, of producing collated copies in a short time without requiring a troublesome operation of an operator.

The image forming apparatus which selects a specific record medium distribution and store control by selection of a specific image forming mode depending on a desired number of copies to be formed and a record medium distribution and storage capability.

According to one aspect of the invention there is contributed an image forming apparatus that comprises means for feeding an original sheet to an exposure position and ejecting the original sheet after exposure, the original sheet feeding means being capable of feeding the original sheet in a first mode and in a second mode.

In the first mode, a plurality of original sheets are fed to the exposure position one sheet at a time and the original sheet is ejected after it is exposed a preset number of times.

In the second mode, a plurality of original sheets are fed to the exposure position one sheet at a time, the original being ejected after being once exposed, this operation being repeated a preset number of times.

In either case, image forming means form an original image on a record medium at the exposure position and storage means having a plurality of record medium storages, the storage means distributing the record media with images formed thereon to the plurality of storages.

Control means are provided for controlling the storage means such that the record media having the images formed thereon are distributed and stored in the plurality of storages in the first mode and the record media having the images formed thereon are stored in a particular one or ones of the plurality of storages in the second mode, the particular one or ones of the plurality of storages beng adapted to store the record media on a distributing basis in the first mode.

BRIEF DESCRIPTION OF THE DRAWINGS

FIG. 2 shows an internal construction of the machine of FIG. 1.

DETAILED DESCRIPTION OF THE PREFERRED EMBODIMENTS

Figure 1:
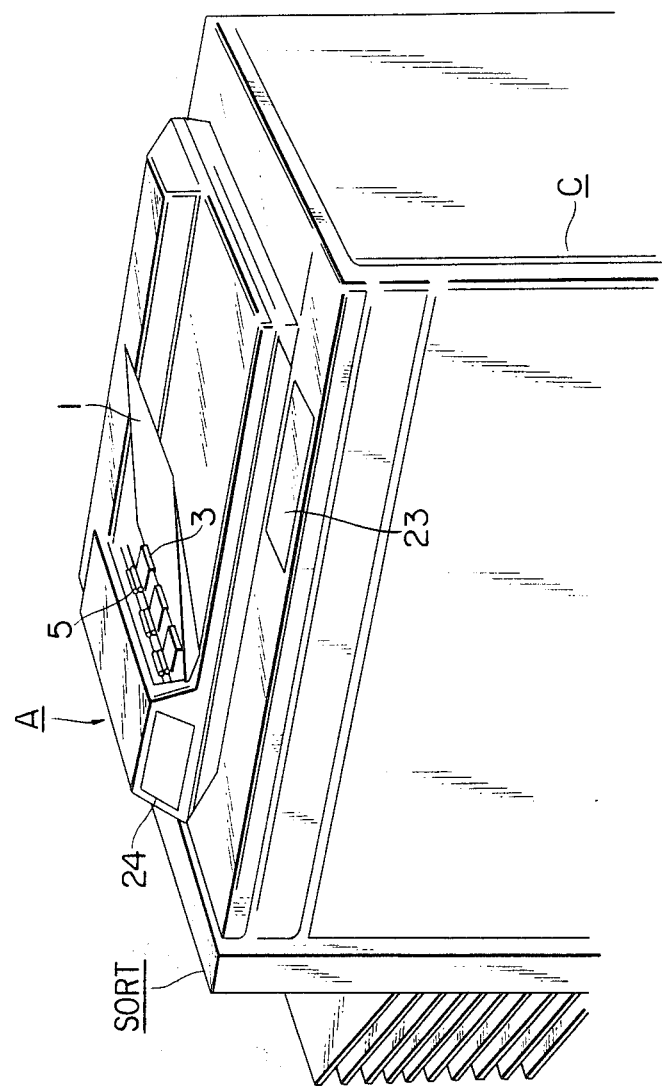
FIG. 1 is a perspective view of a copying machine to which the present invention is applied.

FIG. 1 shows a copying machine to which the present invention is applied, in which C denotes a copying machine main unit, A denotes an automatic original sheet feeder mounted on an exposure platen of the copying machine main unit C and SORT denotes a sorter for distributing and storing copy papers ejected from the copying machine main unit C. Numeral 1 denotes a feed tray on which original sheets are stacked. It can hold one or more original sheets and is inclined downward as it goes toward a feed-out end. Numerals 3 and 5 denote a feed belt and a separation belt, respectively, for separating and feeding the original documents stacked on the feed tray 1 one by one. Numerals 23 and 24 denote control panels by which an operator inputs operation commands to the copying machine main unit C and the automatic original sheet feeder A.

Figure 2:
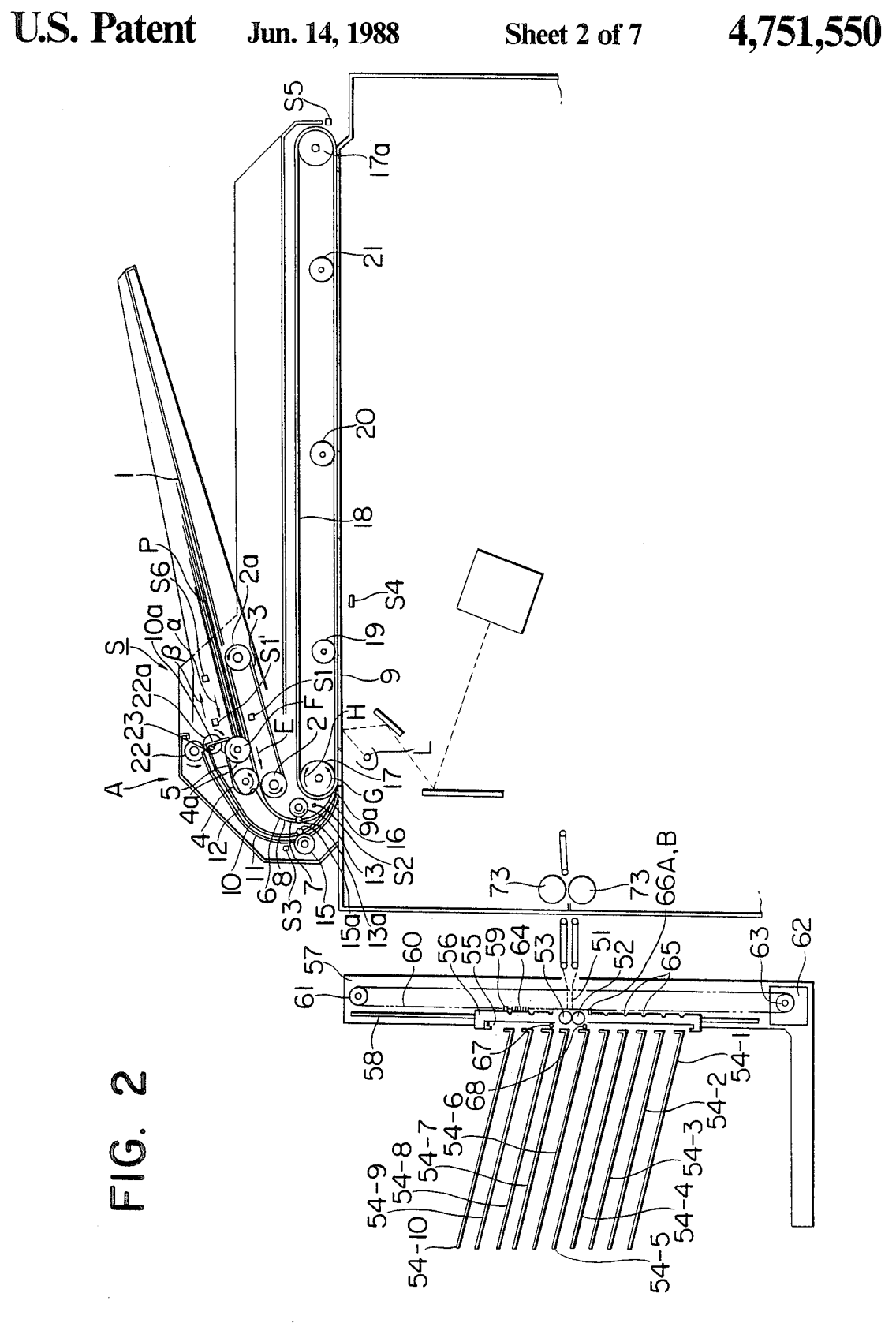

FIG. 2 shows an internal construction of the copying machine of FIG. 1. Numerals 1, 3 and 5 denote the feed tray, the feed belt and the separation belt shown in FIG. 1. P denotes the original sheets stacked on the feed tray 1 with image surfaces facing up.

Numerals 2 and 2a denote feed rollers which rotate the feed belt 3 in a direction of an arrow E to feed the original sheet. Numerals 4 and 4a denote separation rollers which rotates the separation belt 5 in a direction of an arrow F to separate one original sheet with the feed belt 3. The feed belt 3 and the separation belt 5 form a separation/feed unit S. The separation/feed unit S is arranged near a lowermost portion of the original sheets stacked on the tray 1 which is downwardly inclined.

A first sheet path 6 is formed between guides 7 and 8 and functions to feed the original sheet separated by the feed belt 3 and the separation belt 5 onto an original sheet platen glass 9. A second sheet path 10 is formed between guides 11 and 12 and functions to feed a preset number of original sheets having been illuminated by an illumination lamp L from the platen glass 9 to the feed tray 1. The second sheet path 10 is arranged to face the first sheet path 6 and extends from an end 9a of the platen glass 9 to an area above the separation belt 5 through an outer area of the sheet path 6 (a path spaced from the belt 18). Ejection rollers 22 and 22a are mounted at an upper end 10a of the separation belt 5 of the sheet path 10. The original sheet ejected from the platen glass 9 is fed to the sheet path 10 and fed in onto the tray 1 from the side in which the original sheet was fed out by the feed belt 3 and the separation belt 5 (arrow α), in the opposite direction (arrow β) to the direction α. Thus, the direction of the feed-out of the original sheet from the tray 1 and the direction of the feed-in to the tray 1 are opposite.

Numerals 13, 13a and 15, 15a denote sheet feed roller pairs which are rotated in the directions of arrows. The roller pair 13 and 13a feeds the original sheet in the sheet path 6 toward the platen glass 9, and the roller pair 15 and 15a feed the original sheet in the sheet path 10 toward the feed tray 1. Numeral 16 denotes a deflection plate attached to a guide 12 such that an end of the deflection plate 16 contacts the guide 7. The end of the original sheet passed through the sheet path 6 is moved past the deflection plate 16 and the original sheet fed from the platen glass 9 to the sheet path 10 is smoothly transported because the end of the deflection plate 16 is urged to the guide 7. The deflection plate 16 may be formed by a mylar sheet.

Numerals 17 and 17a denote original sheet conveyer rollers which rotate an original sheet conveyer belt 18 to convey the original sheet on the platen glass 9. When the original sheet is to be conveyed onto the platen glass 9 and set at a predetermined position (exposure position), the roller 17 is rotated in a direction of an arrow G, and when the original sheet is to be ejected from the platen glass 9, the roller 17 is rotated in a direction of an arrow H. Numerals 19, 20 and 21 denote belt pressing rollers which press the belt 18 to the glass 9 to assure the feed of the original sheet by the belt 18.

Numerals 22 and 22a denote ejection rollers which kick out the original sheet fed from the sheet path 10 to the feed tray 1. A clock plate, not shown, is rotated in synchronism with the feed roller 17 and a slit of the clock plate is detected by a photointerrupter to generate a clock pulse representing the movement distance of the belt 18.

S1–S6 denote original sheet sensors. The sensor S1 detects whether the original sheet is mounted on the feed tray 1 or not and it comprises a lamp S1' and a photo-transistor. The sensor S2 is a registration sensor for detecting the presence of the original sheet in the sheet path 6 and it is a reflection type sensor which comprises an LED and a photo-transistor. The sensor S3 is a first ejection sensor for detecting the presence of the original sheet in the sheet path 10, the sensor S4 is a platen sensor for detecting the presence of the original sheet on the platen glass 9 and the sensor S5 is a second ejection sensor for detecting the rightward ejection of the original sheets from the platen glass 9. The sensors S3, S4 and S5 are of the same structure as the registration sensor S2. The sensor S6 is a partition sensor for detecting a position of a partition lever, not shown, mounted at the top of a set of original sheets and it includes a Hall IC for detecting a magnet mounted on the partition lever.

A top cover of the separation/feed unit S is openable so that a jammed original sheet in the apparatus is readily removed.

The sorter is now explained. The images on the sheets are fixed by a fixing roller (not shown) after the image formation by the copying machine C and then the sheets are fed by an ejection roller pair 73 and a belt 72 to a conveyer guide 51 of the sorter. The sheets are stored in corresponding trays by conveyer means comprising a pair of rollers 52 and 53. The trays 54-1, 54-2, . . . 54-10 are fixed to a tray frame 55 and a lift member 56 is vertically movable over a length corresponding to a distance between the tray 54-1 to the tray 54-10 along a guide groove 58 of a post 57. An end of a chain (or wire) 60 is fixed to an upper end of a chain mount 59 fixed to the lift member 56 and it is deflected by an idler 61 above the chain 60 and extends to a sprocket 63 to a shaft of a motor 62. The other end of the chain 60 is fixed to a lower end of the chain mount 59 through a spring 64 which serves to absorb a variation of the length of the chain 60 and shock.

When the motor 62 is rotated clockwise, the trays are elevated in a unit. The lift member 56 has notches 65 formed at a pitch equal to a pitch of the trays. When a position sensor 66B fixed to the post 57 senses one of the notches 65, a tray sheet entrance corresponding to the detected notch 65 is at a position of nips of the rollers 52 and 53. The lift member 56 has another notch (not shown) which is parallel to the notches 65 so that an uppermost position and a lowermost position of the lift member 56 can be detected by a combination of a signal from a position sensor 66A associated with the other notch and the signal from the sensor 66B.

Sheet sensors 67 (light emitter) and 68 (photo-sensor) are arranged between the nips of the rollers 52 and 53 and the trays to detect the storage of the sheet in one of the trays.

The operation of the sorter is now explained. As the motor 62 rotates, the trays 54-1, . . . 54-10 descend to the lowermost position so that the sheet entrance of the tray 54-10 reaches the position corresponding to the nips of the rollers 52 and 53. When it is detected by the position sensors 66A and 66B, the motor 62 is stopped and a solenoid brake BKS (see FIG. 5) is actuated. Then, the sheet having the image formed thereon is conveyed to the tray 54-10 by the rollers 52 and 53. The rollers 52 and 53 are rotated by a motor M2 (see FIG. 5) which is energized by the copy start signal from the copying machine C. When a trailing edge of the sheet is detected by the sheet sensors 67 and 68, the motor 62 is rotated clockwise to elevate the trays. When it is detected that the sheet entrance of the tray 54-9 has reached the position corresponding to the nips of the rollers 52 and 53, that is, when the notch 65 corresponding to the tray 54-9 is detected by the position sensors 66A and 66B, the motor 62 is stopped and braked. Thus, the tray 54-9 is ready to accept the sheet. The above operation is repeated a necessary number of times and then the trays are returned to the initial position by a reset signal.

Figure 3:
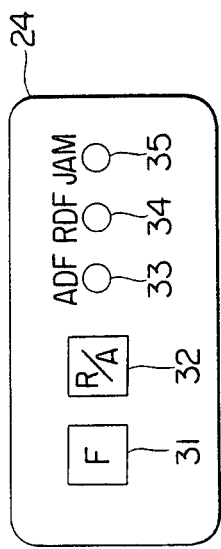
FIG. 3 shows a control panel of an automatic document sheet feeder.

FIG. 3 shows the control panel 24 in the front side of the automatic sheet feeder A. Numeral 31 denotes a mode switch for commanding the feed of the original sheet by the automatic sheet feeder 31. Numeral 32 denotes a selection switch which selects an RDF mode in which each of the successively fed original sheets is copied and fed or an ADF mode in which the original sheet is copied repeatedly by a specified number of times and then the operation is repeated for the next original sheets by the number of times equal to the number of stocked original sheets.

Numerals 33, 34 and 35 denote LED displays. The display 33 is lit when the ADF mode is selected, and the display 34 is lit when the RDF mode is selected. The display 35 is lit when the original sheet jams in the automatic original sheet feeder A.

Figure 4:
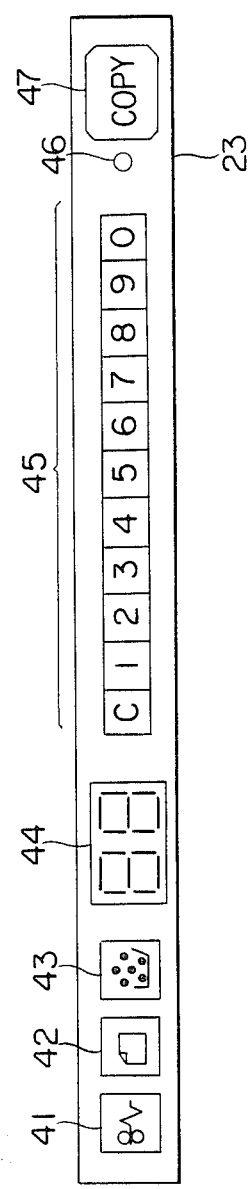
FIG. 4 shows a control panel of the copying machine.

FIG. 4 shows the control panel 23 of the copying machine C. Numeral 41 denotes a jam lamp which indicates the jam in the copying machine, numeral 42 denotes a paper exhaust lamp which indicate the lack of copy papers, numeral 43 denotes a toner exhaust lamp which indicates the lack of toner, numeral 44 denotes a numeric display which displays a numeral entered by numeric input keys 45, numeral 46 denotes an OK lamp which indicates an operation state of the apparatus and numeral 47 denotes a copy button which commands the start of the copy operation. The numeric display 44 may be arranged on the automatic original sheet feeder.

Figure 5B:
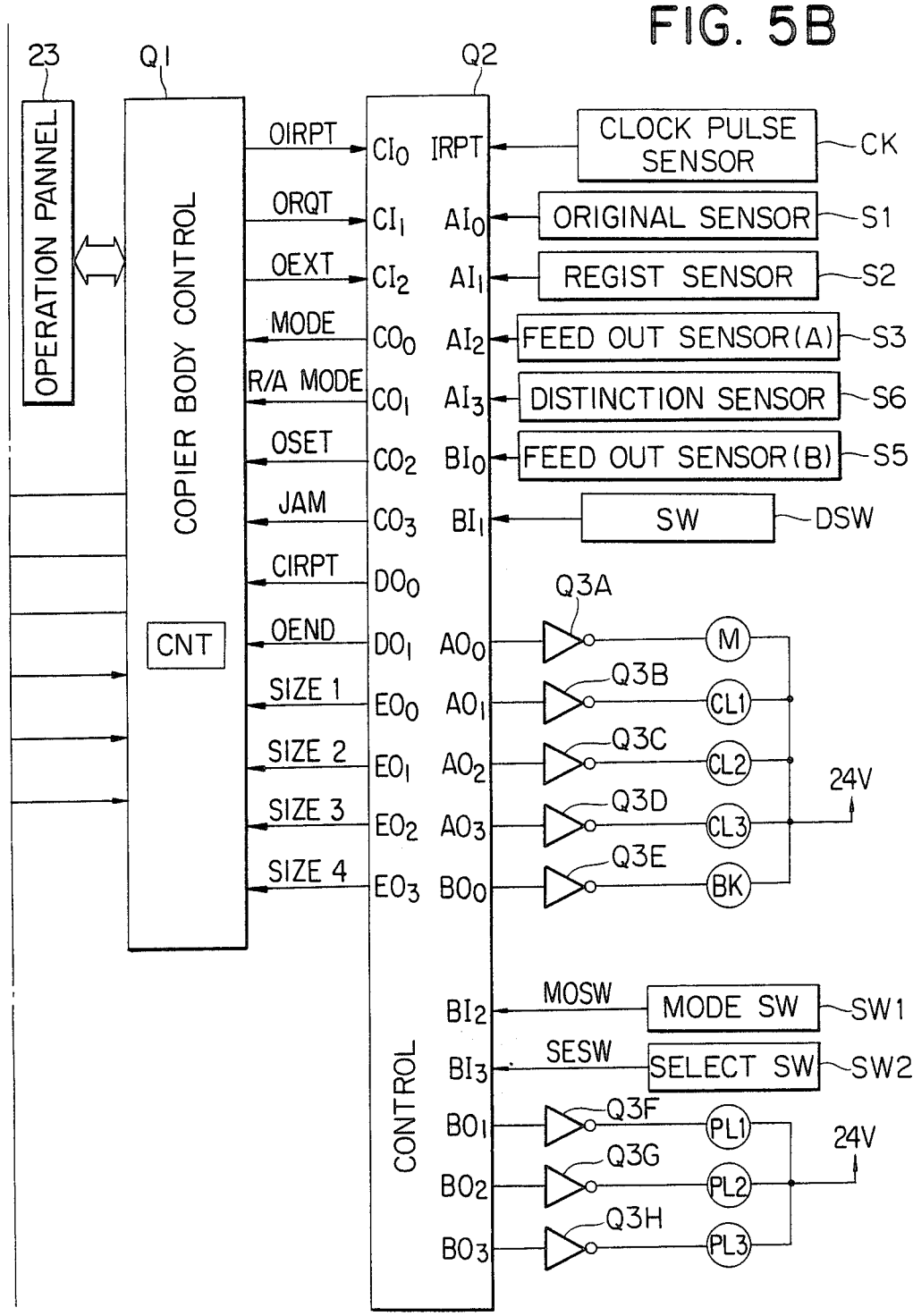
FIG. 5 is a block diagram of a control unit of the machine of FIG. 2.

FIG. 5 shows a control unit for controlling the operation of the embodiment of FIG. 2.

In FIG. 5, $Q_1$ denotes a controller for the copying machine C, which includes a well-known microcomputer, $Q_2$ denotes a controller for the automatic original sheet feeder A, which is a microcomputer LSI including ROM, RAM, ALU and I/O latch. IRPT denotes an interrupt terminal of the microcomputer $Q_2$. $AI_0$, $AI_1$, $AI_2$, $AI_3$, $BI_0$, $BI_1$, $BI_2$ $BI_3$, $CI_0$, $CI_1$ and $CI_2$ denote input ports. $AO_0$, $AO_1$, $AO_2$, $AO_3$, $BO_0$, $BO_1$, $BO_2$, $BO_3$, $CO_0$, $CO_1$, $CO_2$, $CO_3$, $DO_0$, $DO_1$, $EO_0$, $EO_2$ and $EO_3$ denote output ports.

The controller $Q_2$ supplies control signals to the output ports in accordance with input signals to the input ports to control the operations.

CK denotes a clock pulse sensor which detects the slit of the clock plate rotated in synchronism with the feed roller 17. It may be a photo-interrupter including an LED and a photo-transistor.

S1–S3 and S5, S6 denote the original sheet sensors described above. DSW denotes a switch for detecting the open/closed state of the top cover of the separation/feed unit S.

Q3A, Q3B, ... Q3H denote transistor arrays.

M denotes a DC motor to drive the rollers of the apparatus. CL1 denotes a solenoid clutch for transmitting the rotation of the motor M to drive the rollers 2 and 4 in the direction of the arrow shown in FIG. 2.

CL3 denotes a solenoid clutch for transmitting the rotation of the motor M to drive the roller 17. When the clutch CL2 is energized, the roller 17 is rotated in the direction G shown in FIG. 2.

CL3 denotes a clutch for rotating the roller 17 oppositely to the direction G. When the clutch CL3 is energized, the roller 17 is rotated in a direction H. The roller 13 is rotated in the direction of the arrow shown in FIG. 2 when the clutches CL2 and CL3 are energized.

BK denotes an electric brake to precisely stop the roller 17.

SW1 denotes the mode switch 31 which is actuated by an operator. SW2 denotes the selection switch to select the ADF mode or the RDF mode.

PL1 denotes the display 33 (see FIG. 3) which is lit in the ADF mode, and PL2 denotes the display 34 (see FIG. 3) which is lit in the RDF mode. PL3 denotes the display 35 (see FIG. 3) which is lit when the original sheet jams.

The input ports $CI_0$, $CI_1$ and $CI_2$ receive signals from the controller $Q_1$ for the copying machine C and the output ports $CO_0$, $CO_1$, $CO_2$, $CO_3$, $DO_0$, $DO_1$, $EO_0$, $EO_1$, $EO_2$ and $EO_3$ supply control signals to the controller $Q_1$.

The control signals between the copying machine controller $Q_1$ and the automatic original sheet feeder controller $Q_2$ are briefly explained. ORQT denotes an original sheet feed request signal, OEXT denotes an original sheet ejection request signal, and OSET denotes a signal for indicating the completion of loading of the original sheet to the exposure position. It is produced when a predetermined number of clock pulses are supplied to the interrupt terminal IRPT after the trailing edge of the original sheet has been detected by the sensor S2. OEND denotes a signal for indicating the end of a set of original sheets. MODE denotes a signal for indicating whether the automatic original sheet feeder is in the operation mode or not. It corresponds to the turn-on and the turn-off of the mode switch SW1. R/A MODE denotes a signal for indicating whether the automatic original sheet feeder is in the ADF mode or the RDF mode. It is switched in accordance with the select switch SW2. If the preset copy count exceeds the number of bins when the sorter is operated, the ADF mode is selected until the copy count reaches the number of bins without regard to the select switch SW2 and the RDF mode is selected for the copies exceeding the number of bins. JAM denotes a signal indicating a jam of the original sheet. SIZE1–SIZE4 denote signals indicating the sizes of the original sheets. They are produced by measuring the transit time of the original sheet being fed by counting the clock pulses to determine the sizes of the original sheets.

$Q_3$ denotes a controller for the sorter, which includes a microcomputer. In the controller $Q_3$, $I_0$–$I_6$ denote input terminals and $O_0$–$O_6$ denote output terminals. SSTRT denotes a sorter start signal for controlling the operation of the sorter and BCR denotes a singal for returning the trays of the sorter to the original position. Those signals are supplied from the copying machine C. INTC denotes a signal to stop the shift of the trays of the sorter. SSTBY denotes a signal to inform to the copying machine C that the sorter has been reset to the original position, SJAM denotes a signal to indicate the jam in the sorter and SMODE denotes a signal to indicate that a sorter selection button (not shown) has been depressed. SS1 denotes a signal from the sheet sensor 68, and SS2 and SS3 denote signals from the tray position sensors 66A and 66B, respectively. SS4 denotes a signal to indicate the release of a pawl (not shown) which prevents the drop of the trays. It is produced by a photo-transistor (not shown) after a solenoid SL (not shown) for releasing the pawl when the trays are returned to the original position has been energized.

The motor Ml (corresponding to the motor 62 of FIG. 2) is connected through drivers SSRU and SSRD. The motor Ml is rotated in the direction to elevate the trays by the signal supplied from the output terminal $O_2$ and it is rotated in the opposite direction, that is, in the direction to lower the trays by the signal supplied from the output terminal $O_3$. The drive motor M2 for the movable rollers 52 and 53 are connected through a driver SSR. A brake BKS of the motor Ml is connected through the driver D1 and the solenoid SL is connected through a driver D2.

The position sensor outputs SS2 and SS3 are further explained. The signals SS2 and SS3 are produced by position sensors 56A and 56B, respectively, to determine the position of the tray being used by the combination of those signals.

While a detailed explanation is omitted here because it does not directly relate to the present invention, if the signals SS2 and SS3 are "1" and "0", respectively, it indicates that the trays are at the lowermost position and the tray 54-10 is selected. When the signals SS2 and SS3 are "0" and "1", respectively, it indicates that the intermediate tray 54-2 - 54-9 is selected. When the signals SS2 and SS3 are "1" and "1", respectively, it indicates that the trays are at the uppermost positions and the tray 54-1 is selected.

Figure 6A:
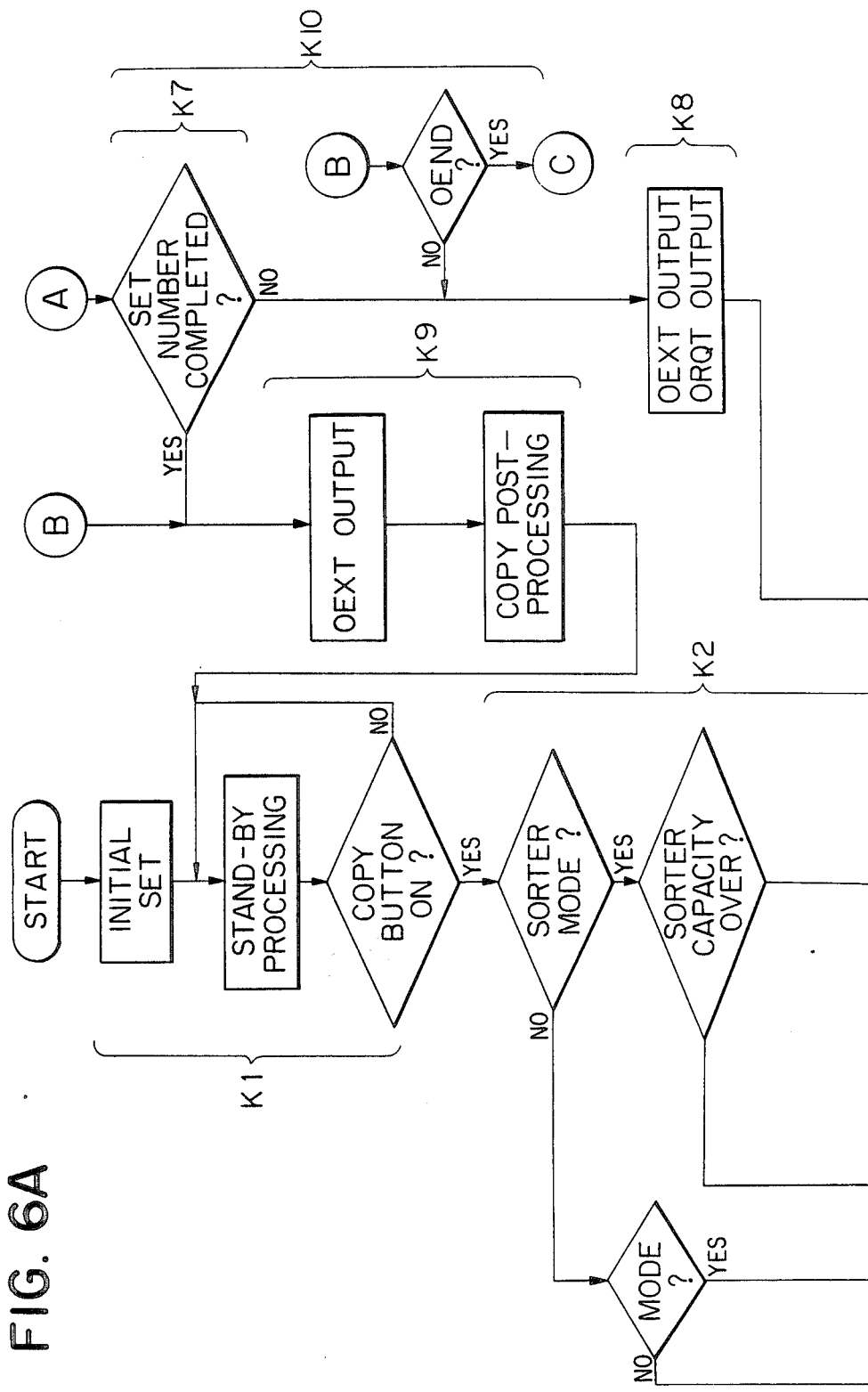
FIG. 6 is a flow chart of an operation of the machine of FIG. 2.

FIG. 6 shows a flow chart of an operation program for the present embodiment. Let us assume that the signal SMODE is on to select the sorter mode and 13 copies which exceeds a maximum number of trays or 10 of the sorter are to be formed by using the automatic original sheet feeder A.

Upon the turn-on of the power supply of the copying machine C, the initialization and the stand-by processing are carried out until a fixing temperature is attained. Then, the copy button 47 is depressed (step K1) and the process goes to a step K2. In the step K2, it is checked if the sorter mode SMODE has been selected or not, and if it has not, the signal MODE is checked to determine if the operation mode by the automatic original sheet feeder A has been selected. Since the sorter mode SMODE has been selected in the present example, it is checked if the count in the numeric display 44 exceed the number of trays of the sorter, that is, ten, and if the count is no larger than ten, the ADF mode is set and a copy sequence is started. If the count is equal to or larger than eleven, the ADF mode is set for ten copies and the controller memorizes the RDF mode for the eleventh and subsequent copies and the copy sequence is started (step K2).

In a step K3, the controller Q1 sends the original sheet feed request signal ORQT to the input port CII of the controller $Q_2$ in order to set the first original sheet. Thus, the automatic original sheet feeder A starts the original sheet feed operation and sets the original sheet to the exposure position. Then it sends the original sheet feed end signal OSET from the output port $CO_2$ to the copying machine controller Q1. The process then goes to a step K4. In the step K4, the copying operation is carried out by the copying machine, and after the optical system completed the exposure, the process goes to a step K5 or K6. In the RDF mode, the process goes to the step K5, and in the ADF mode, it goes to the step K6.

If the ten copies have not been formed, the ADF mode is discriminated and the process goes to the step K6. The count of the copy counter CNT in the controller Q1 is incremented by one for each copy completed and the count is displayed on the display 44. When the count exceeds ten, the controller Q1 automatically selects the RDF mode and the process goes to the step KS through the step K4 and the copy counter CNT indicates the copy count in the RDF mode. As a result, the copy count is incremented by one for each copy completed. In the RDF mode, the count is incremented by one by the signal OEND. In a step K2, it is checked if the preset number of copies have been formed, and if they have not, the signals ORQT and OEXT are supplied to the automatic original sheet feeder A in a step K8. If they have been completed, the process goes to a step K2.

In this manner, the ten copies are formed in the ADF mode and stored in the trays 54-10, 54-9, . . . 54-1 of the sorter. For the remaining three copies, the automatic original sheet feeder A is operated in the RDF mode so that the copies are stored in the uppermost tray 54-10 of the sorter. Alternatively, when a predetermined number of copies have been successively stored in one of the trays of the sorter, the copies may be stored in the next tray so that the remaining copies are sequentially distributed to the trays.

As described hereinabove, in the copying machine having the automatic original sheet feeder and the sheet handler, the ADF mode and the RDF mode are provided. In the ADF mode, a specified number of copies are successively formed for the original sheet, the copy papers are sequentially stored in the trays, and after the successive copy operation, the next original sheet is fed and the successive copy operation is repeated until the original sheets stacked have been copied. In the RDF mode, one copy is formed for each of the successively fed original sheets until a specified number of original sheets have been fed and the copy papers of the respective original sheets are sequentially distributed to the trays of the sorter. When the operator wants a larger number of copies than the number of trays of the sorter, the apparatus is operated in the ADF mode until the copy count reaches the number of trays, and after it has exceeded the number of trays, the apparatus is operated in the RDF mode and the copies are ejected to the overflow tray which can stack a larger number of copies than an ordinary tray does. Thus, the copies which are larger in number than the number of trays of the sorter can be collated automatically without the intervention of the operator.

Since the apparatus is first operated in the ADF mode, a time loss is prevented and a faster copy operation is attained.

While the automatic original sheet feeder operable in the ADF mode and the RDF mode is used in the present embodiment, the present invention is not limited thereto. The present invention is applicable to an image forming apparatus having a copy mode in which the original sheet is exposed while it is moved and a copy mode in which the original sheet is exposed while it is stationary.

What I claim is:

1. An image forming apparatus comprising:

original sheet feed means for feeding an original sheet to an exposure position and ejecting said original sheet after exposure, said original sheet feed means being capable of feeding said original sheet selectively in a first mode and a second mode, wherein in said first mode a plurality of original sheets are fed to said exposure position one sheet at a time and each said original sheet is ejected after a selected preset number of time of exposure, and in said second mode a plurality of original sheets are fed to said exposure position one sheet at a time and each said original sheet is ejected after one time of exposure;

image forming means for forming an image of an original, at said exposure position, into a record medium;

storage means having a plurality of record medium storage locations and including means for generating a signal indicating that said storage means is available for storage, said storage means distributing said record media having the images formed thereon by said image forming means to said plurality of record medium storage locations; and control means responsive to said signal generated by said signal generating means indicating that said storage means is available for storage, for setting an operation mode of said original sheet feed means to said first mode after occurrence of a start instruction of image formation, but before feed of a first original sheet is initiated.

2. An image forming apparatus according to claim 1 wherein said control means selects the operation mode of said original sheet feed means in accordance with said preset number and the number of said record medium storages.

3. An image forming apparatus according to claim 2 wherein said control means operates said original sheet feed means in said first mode when said preset number is no larger than the number of said record medium storages.

4. An image forming apparatus according to claim 2 wherein said control means operates said original sheet feed means in said first mode only for the record media equal in number to the number of said record medium storages when said preset number exceeds the number of said record medium storages, and operates said original sheet feed means in said second mode for the record media in excess of the number of said record medium storages.

5. An image forming apparatus according to claim 4 wherein said control means controls said storage means such that the record media in excess of the number of said record medium storages are stored in one of said record medium storages in said second mode.

6. An image forming apparatus according to claim 4 wherein said control means controls said storage means such that the record media in excess of the number of said record medium storages are stored in different ones of said record medium storages in said second mode.

* * * * *

UNITED STATES PATENT AND TRADEMARK OFFICE
CERTIFICATE OF CORRECTION

PATENT NO. : 4,751,550
DATED : June 14, 1988
INVENTOR(S) : KOICHI MURAKAMI It is certified that error appears in the above-identified patent and that said Letters Patent is hereby corrected as shown below:

Column 1, line 9, "BACKGROUD" should read --BACKGROUND--;

line 12, "copying," should read --a copying--;

line 31, "capable," should read --capable--;

line 34, "which" should be deleted.

Column 5, line 57, "controller $Q_2$" should read --controller Q2--.

Column 6, line 40, "terminal $0_2$" should read --terminal $0_2$--.

Column 7, line 20, "port CI1" should read --port $CI_1$--.

Column 8, line 37, "time" should read --times--.

Signed and Sealed this

Twenty-second Day of November, 1988

*Attest:*

DONALD J. QUIGG

*Attesting Officer*     *Commissioner of Patents and Trademarks*